(12) United States Patent
Qian et al.

(10) Patent No.: US 8,873,141 B2
(45) Date of Patent: Oct. 28, 2014

(54) STEREOMICROSCOPE

(75) Inventors: Li Qian, Beijing (CN); Li Fan, Beijing (CN); Chen Feng, Beijing (CN); Yu-Quan Wang, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 234 days.

(21) Appl. No.: 13/600,521

(22) Filed: Aug. 31, 2012

(65) Prior Publication Data

US 2013/0050812 A1 Feb. 28, 2013

(30) Foreign Application Priority Data

Aug. 31, 2011 (CN) .......................... 2011 2 0323468

(51) Int. Cl.
*G02B 21/34* (2006.01)
*G02B 21/06* (2006.01)
*G02B 21/22* (2006.01)

(52) U.S. Cl.
CPC ............... *G02B 21/06* (2013.01); *G02B 21/22* (2013.01)
USPC ......................................................... 359/398

(58) Field of Classification Search
USPC .......................................... 359/376, 396, 398
See application file for complete search history.

(56) References Cited

U.S. PATENT DOCUMENTS

| | | | | |
|---|---|---|---|---|
| 5,249,077 A * | 9/1993 | Laronga et al. | ............... | 359/385 |
| 6,052,224 A * | 4/2000 | Richardson | ................... | 359/398 |
| 6,818,451 B2 * | 11/2004 | Angros | ............................ | 436/63 |
| 7,718,124 B2 * | 5/2010 | Simmet | ........................ | 422/547 |
| 7,718,423 B2 * | 5/2010 | Tsuchiya | ................... | 435/288.7 |
| 2006/0148069 A1 * | 7/2006 | Fujita | .......................... | 435/288.4 |
| 2007/0279735 A1 * | 12/2007 | Sieckmann | ................... | 359/396 |
| 2009/0251751 A1 * | 10/2009 | Kuhlmann | ....................... | 359/15 |
| 2013/0182318 A1 * | 7/2013 | Eastman et al. | ............. | 359/398 |
| 2013/0201553 A1 * | 8/2013 | James et al. | .................. | 359/398 |

* cited by examiner

*Primary Examiner* — Frank Font
(74) *Attorney, Agent, or Firm* — Novak Druce Connolly Bove + Quigg LLP

(57) ABSTRACT

A stereomicroscope includes a base and a vessel which is disposed on the base. The vessel includes a transparent body and a light emitting unit. The transparent body has a bottom and a sidewall. The bottom and the sidewall define an opening. The sidewall extends from a side of the bottom. The opening of the transparent body places a specimen. The light emitting unit is fixed in the sidewall of the transparent body for emitting light. The light emitted from the light emitting unit illuminates the specimen, and is substantially parallel to the bottom of the transparent body.

14 Claims, 5 Drawing Sheets

US 8,873,141 B2

STEREOMICROSCOPE

CROSS-REFERENCE TO RELATED APPLICATIONS

This application claims all benefits accruing under 35 U.S.C. §119 from China Patent Application No. 201120323468.6, filed on Aug. 31, 2011 in the China Intellectual Property Office, disclosure of which is incorporated herein by reference.

BACKGROUND

1. Technical Field

The present disclosure relates to a stereomicroscope having a light emitting unit configured for emitting light to illuminate a specimen.

2. Description of Related Art

Stereomicroscopes include a base and a permanently incorporated illumination system to illuminate a specimen or a sample to be viewed. The illumination system can be a reflected-light system and/or transmitted-light system.

Background light can interfere with the light emitted from the reflected-light system of a conventional stereomicroscope. Base scattering light and/or the specimen scattering light can interfere with the light emitted from the transmitted-light system of a conventional stereomicroscope. Thus, a view of the specimen placed on the base of the conventional stereomicroscope is unclear.

What is needed, therefore, is to provide a stereomicroscope which can overcome the shortcoming described above.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
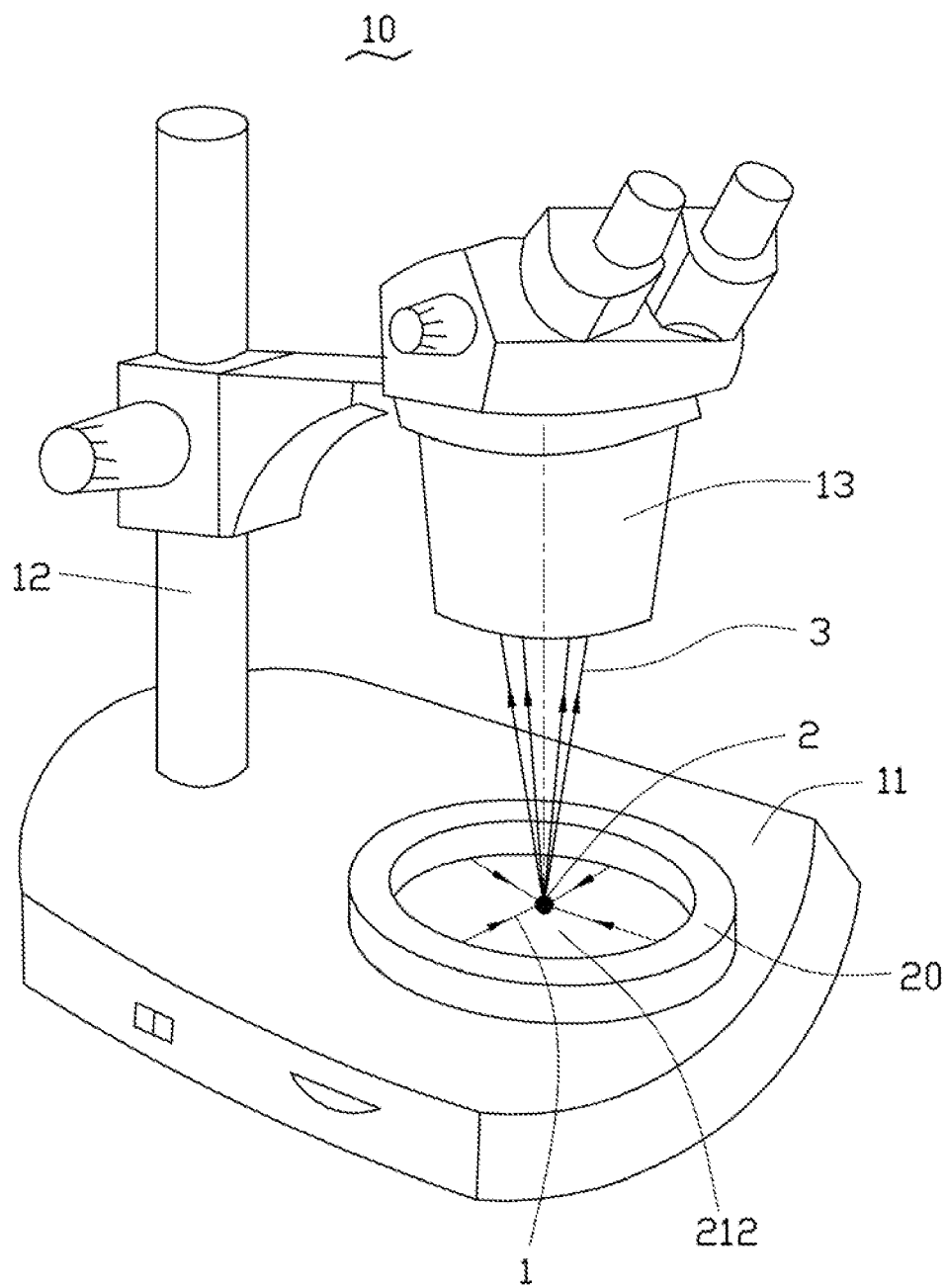
FIG. 1 is an isometric view of one embodiment of a stereomicroscope.

According to one embodiment, a touch panel stereomicroscope 10 as illustrated in FIG. 1 includes a base 11, a liftable support 12, a lens set 13, and a vessel 20. The liftable support 12 and the vessel 20 are disposed on the base 11. The lens set 13 is fixed on the liftable support 12. The lens set 13 can rise and fall according to the liftable support 12. The vessel 20 can be taken apart from the base 11.

Figure 2:
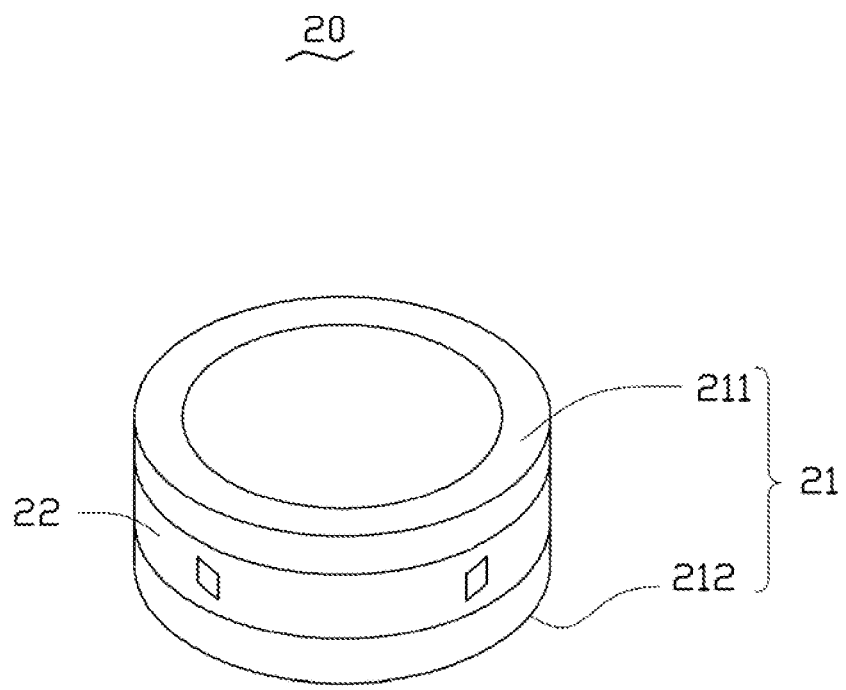
FIG. 2 is an isometric view of one embodiment of a vessel of the stereomicroscope shown in FIG. 1.

Referring to FIG. 2, the vessel 20 comprises a transparent body 21 and a light emitting unit 22. The transparent body 21 has a bottom 212 and a sidewall 211. The bottom 212 and the sidewall 211 define an opening. The sidewall 211 extends from a side of the bottom 212. The opening of the transparent body 21 places a specimen 2. The light emitting unit 22 is fixed in the sidewall 211 of the transparent body 21 and emits a light 1. The light 1 is substantially parallel to the bottom 211 of the transparent body 21 and illuminates the specimen 2. The reflected light 3 reflected off the specimen 2 is emitted to the lens set 13 because the specimen 2 is illuminated by the light 1. Thus, a view of the specimen 2 can be clearly observed via the lens set 13.

Figure 3:
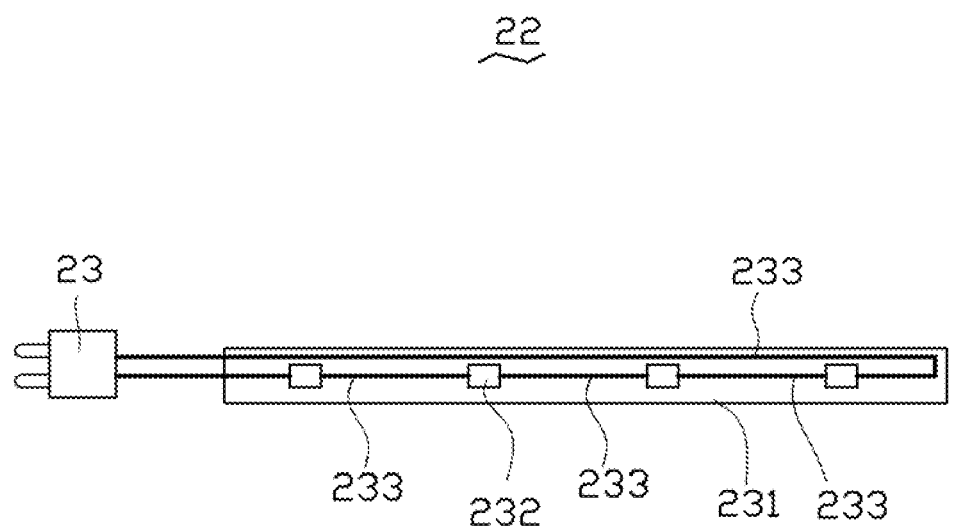
FIG. 3 is a schematic view of one embodiment of a light emitting unit of the vessel shown in FIG. 2.

Referring to FIG. 3, the light emitting unit 22 comprises a power plug 23, a circuit board 231, a number of point light sources, and a number of conductive wires 233. The point light sources are a number of light-emitting diodes (LEDs) 232. The power plug 23 is electrically connected to the LEDs 232 via the conductive wires 233. When the power plug 23 is connected to a power source (not shown), the power source provides power to the LEDs 232 for emitting the light 1. The LEDs 232 are fixed on the circuit board 231 and electrically connected to each other via the conductive wires 233. Furthermore, the LEDs 232 can be fixed in the sidewall 211 of the transparent body 21 at a regular interval. In one embodiment, the sidewall 211 of the transparent body 21 comprises a number of cavities (not shown). The LEDs 232 are respectively fixed in the cavities of the sidewall 211 of the transparent body 21. The LEDs 232 can be electrically connected to each other in series or in parallel. In one embodiment, there are four LEDs 232 fixed on the circuit board 231. The LEDs 232 are electrically connected to each other in series via the conductive wires 233.

In another embodiment, the light emitting unit 22 can comprise a power plug, a number of circuit boards, a number of point light sources, and a number of conductive wires. The point light sources are a number of LEDs. The power plug is electrically connected to the LEDs via the conductive wires. The LEDs are respectively fixed on the circuit boards and electrically connected to each other via the conductive wires.

Figure 4:
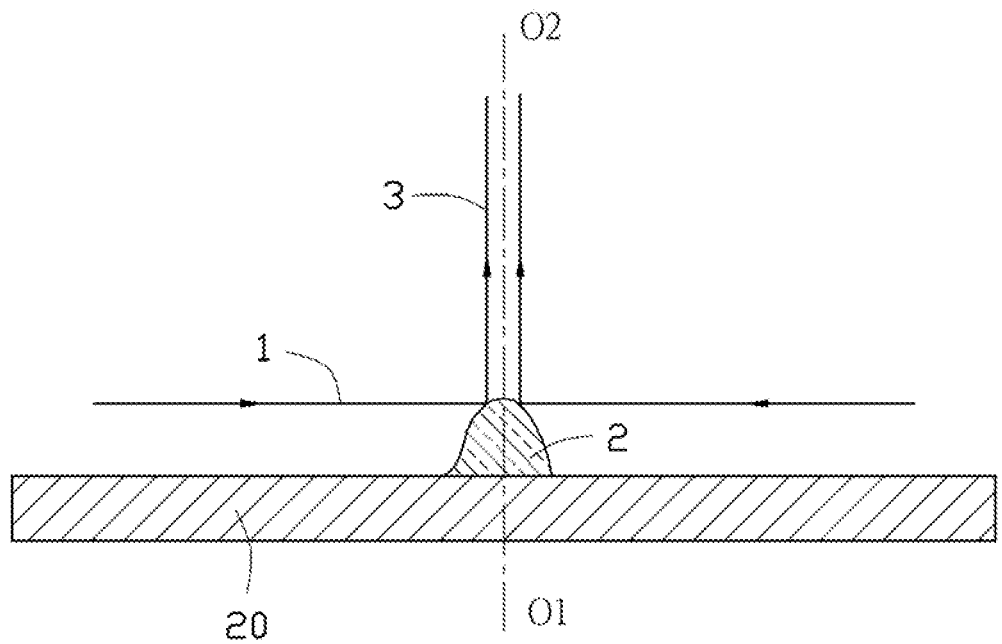
FIG. 4 is an optical path diagram of one embodiment of the stereomicroscope shown in FIG. 1.

FIG. 4 illustrates optical paths of the light 1, the reflected light 3, and an optical axis O1-O2 of the lens set 13. The vessel 20 carries the specimen 2. The light 1 emitted from the light emitting unit 22 is substantially perpendicular to the optical axis O1-O2 of the lens set 13. Furthermore, the light 1 illuminates the specimen 2 from different directions. The reflected light 3 is then reflected off the specimen 2 and emitted to the lens set 13 along the optical axis O1-O2 of the lens set 13. In other words, the reflected light 3 is substantially parallel to the optical axis O1-O2 of the lens set 13. Thus, a view of the specimen 2 can be clearly observed via the lens set 13.

Figure 5:
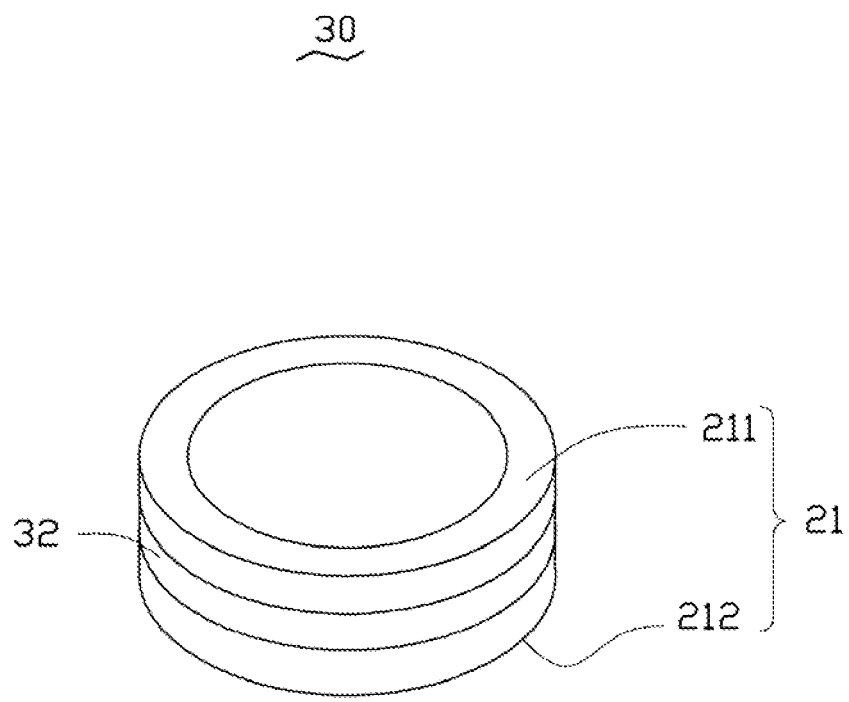
FIG. 5 is an isometric view of another embodiment of a vessel of the stereomicroscope shown in FIG. 1.

FIG. 5 illustrates another embodiment of a vessel 30 comprising a transparent body 21 and a light emitting unit 32. The transparent body 21 has a bottom 212 and a sidewall 211. The bottom 212 and the sidewall 211 define an opening. The sidewall 211 extends from a side of the bottom 212. The opening of the transparent body 21 places the specimen 2. The light emitting unit 32 is fixed in the sidewall 211 of the transparent body 21 and emits light 1.

The sidewall 211 comprises an intermediate region, such as an annular cavity (not shown). The light emitting unit 32 comprises a line light source. In one embodiment, the line light source is an annular cold cathode fluorescent lamp (CCFL). The annular CCFL is fixed in the annular cavity of the sidewall 211 of the transparent body 21. When the annular CCFL is electrically connected to a power source (not shown), the power source provides power to the annular CCFL for emitting the light 1.

Accordingly, the present disclosure is capable of providing a light emitting unit of a stereomicroscope for emitting lights parallel to a base of the stereomicroscope to illuminate a specimen, which can reduce interference of the background light, the base scattering light and the specimen scattering light, and improve definition of view of the specimen.

Finally, it is to be understood that the above-described embodiments are intended to illustrate rather than limit the present disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

What is claimed is:

1. A stereomicroscope comprising a base and a vessel disposed on the base, the vessel comprising:
    a transparent body having a bottom and a sidewall with an opening defined therein, the sidewall extending up from a side of the bottom, and the opening of the transparent body being configured for placing at least one specimen; and
    a light emitting unit fixed in the sidewall of the transparent body and configured for emitting light,
    wherein the light emitted from the light emitting unit illuminates the at least one specimen, and is substantially parallel to the bottom of the transparent body.

2. The stereomicroscope as claimed in claim 1, further comprising a liftable support disposed on the base and a lens set fixed on the liftable support.

3. The stereomicroscope as claimed in claim 1, wherein the light emitting unit comprises a plurality of conductive wires, a circuit board, and a plurality of light-emitting diodes fixed on the circuit board, wherein the plurality of light-emitting diodes are electrically connected to each other via the plurality of conductive wires.

4. The stereomicroscope as claimed in claim 1, wherein the light emission unit comprises at least one light source.

5. The stereomicroscope as claimed in claim 4, wherein the at least one light source is selected from the group consisting of a point light source and a line light source.

6. The stereomicroscope as claimed in claim 4, wherein the at least one light source is an annular cold cathode fluorescent lamp (CCFL).

7. The stereomicroscope as claimed in claim 6, wherein the sidewall of the transparent body comprises an intermediate region, and the annular CCFL is fixed in the intermediate region of the sidewall of the transparent body.

8. The stereomicroscope as claimed in claim 1, wherein the light emission unit comprises a plurality of light-emitting diodes fixed in the sidewall of the transparent body at a regular interval.

9. The stereomicroscope as claimed in claim 8, wherein the sidewall of the transparent body comprises a plurality of cavities, and the plurality of light-emitting diodes are respectively fixed in the plurality of cavities of the sidewall of the transparent body.

10. A stereomicroscope comprising a base, a liftable support disposed on the base, a lens set fixed on the liftable support, and a vessel disposed on the base, the vessel comprising:
    a transparent body having a bottom and a sidewall with an opening defined therein, the sidewall extending up from a side of the bottom, and the opening of the transparent body being configured for placing at least one specimen; and
    a light emitting unit comprising a plurality of conductive wires and a plurality of light-emitting diodes being configured for emitting light, wherein the plurality of light-emitting diodes are fixed in the sidewall of the transparent body and electrically connected to each other via the plurality of conductive wires, and the light emitted from the plurality of light-emitting diodes illuminates the at least one specimen and is substantially parallel to the bottom of the transparent body.

11. The stereomicroscope as claimed in claim 10, wherein the plurality of light-emitting diodes fixed in the sidewall of the transparent body at a regular interval.

12. The stereomicroscope as claimed in claim 11, wherein the sidewall of the transparent body comprises a plurality of cavities, and the plurality of light-emitting diodes are respectively fixed in the plurality of cavities of the sidewall of the transparent body.

13. A stereomicroscope comprising a base, a liftable support disposed on the base, a lens set fixed on the liftable support, and a vessel disposed on the base, the vessel comprising:
    a transparent body having a bottom and a sidewall with an opening defined therein, the sidewall extending up from a side of the bottom, and the opening of the transparent body being configured for placing at least one specimen; and
    an annular CCFL fixed in the sidewall of the transparent body and being configured for emitting light,
    wherein the light emitted from the annular CCFL illuminates the at least one specimen, and is substantially parallel to the bottom of the transparent body.

14. The stereomicroscope as claimed in claim 13, wherein the sidewall of the transparent body comprises an intermediate region, and the annular CCFL is fixed in the intermediate region of the sidewall of the transparent body.

* * * * *